United States Patent
Warrick

[19]
[11] Patent Number: 6,123,067
[45] Date of Patent: Sep. 26, 2000

[54] SOLAR COLLECTOR TRACKING SYSTEM

[75] Inventor: James C. Warrick, Prescott, Ariz.

[73] Assignee: Amonix, Inc., Torrance, Calif.

[21] Appl. No.: 09/282,315

[22] Filed: Mar. 31, 1999

[51] Int. Cl.[7] .................................. F24J 2/54; F24J 2/40
[52] U.S. Cl. ...................... 126/593; 126/600; 126/601; 126/604; 126/605; 126/700; 126/698
[58] Field of Search ....................... 126/600, 601, 126/700, 602, 603, 604, 605, 606, 607, 608, 684, 698, 572, 573, 574, 576, 593, 696; 353/3; 250/203.4, 203.1

[56] References Cited

U.S. PATENT DOCUMENTS

| | | | |
|---|---|---|---|
| 4,223,174 | 9/1980 | Moeller | 250/203.4 |
| 4,864,317 | 9/1989 | Sorko-Ram . | |
| 5,317,145 | 5/1994 | Corio | 250/203.4 |

Primary Examiner—Carl D. Price
Attorney, Agent, or Firm—Charles C. Logan II

[57] ABSTRACT

A solar collector tracking system that has a solar collection device having multiple lens assemblies mounted on its front surface. An exoskeleton structure is secured to the rear surface of the solar collection device and it is pivotally secured about a horizontal axis to the front end of an azimuth platform assembly. A hydraulic elevation actuator is pivotally mounted in the azimuth platform assembly about a horizontal axis and the front end of its piston rod is pivotally connected to the rear surface of the solar collection device and this allows it to be pivoted approximately 90 degrees between a vertical operating position and a horizontal storage position. The azimuth platform assembly is journaled on the top end of a tower extending up from the ground. A tubular post is rigidly secured to the top end of the post. A drive head extends horizontally from the tubular post and it has a pivot pin that extends upwardly therefrom. A primary and a secondary azimuth hydraulic actuator have the front ends of their respective piston rods coupled to the pivot pin. The opposite ends of the azimuth hydraulic actuators are pivotally secured to the interior of the azimuth platform assembly. A hydraulic power unit is connected to the respective hydraulic actuators. An electronic controller monitors signals from an azimuth encoder sensor and an elevation encoder sensor and it directs the respective hydraulic actuators to move their respective piston rods inwardly and outwardly so that the solar collection device can be rotated to track the rays of the sun.

13 Claims, 16 Drawing Sheets

SOLAR COLLECTOR TRACKING SYSTEM

BACKGROUND OF THE INVENTION

The invention relates to a tracking system and more specifically to one that may be used to accurately point a solar collector at the sun throughout the day.

Present day solar collector tracking systems usually employ two independent drives to tilt the collector about two axes. One axis is the elevation axis, whereby the collector is tilted within an angular range of about ninety degrees between "looking at the horizon" and "looking straight up". The other axis is vertical, commonly called "azimuth". A typical day starts with the azimuth drive pointing the collector east and ends with it pointing west. The required range of angular rotation depends on the earth's latitude at which the solar collector is installed. In the tropics the angular rotation needs more than 360 degrees.

The prior art solar collector tracking systems generally use electric drives having high ratio gear reducers to turn the collector in the direction of the sun. Often, the angle that the collector is pointing is calculated by counting the turns of the electric motor (from a 0 reference point signaled by another switch). Error in the gear reducers or linkage between the motor and collector, such as backlash and non-linearly, detracted from the accuracy. When high accuracy was required, the gear reducers were very expensive.

Prior art drives have been known to be broken by high winds and dust devils. Thus the solar collector tracking systems normally require that the collector be capable of going into wind stow position to avoid damage when winds exceed those required by building codes. "Wind stow" is an attitude of the collector that presents the smallest area to the wind. Generally, a wind sensor will trigger a command for the elevation actuator to point the collector straight up. Prior art electric elevation actuators with high ratio speed reducers are very slow to put the collector into wind stow, sometimes taking as long as forty-five minutes.

It is an object of the invention to provide a novel solar collector tracking system that eliminates the need for electric drives having expensive high ratio gear reducers to turn the collector in the direction of the sun.

It is another object of the invention to provide a novel solar collector tracking system that dramatically reduces wind stow time for the solar collector when compared to the amount of time required by present day solar collector tracking systems that utilize electric drives and high ratio gear reducers.

It is also an object of the invention to provide a novel solar collector tracking system that utilizes hydraulic actuators powered by a hydraulic power unit that receives its directions from an electronic controller that monitors the azimuth angles and elevation angles of a solar collector panel.

It is an additional object of the invention to provide a novel solar collector tracking system that utilizes an accumulator in its hydraulic power unit that eliminates the starting and stopping of a motor and pump every few seconds to produce the required sun tracking for the solar collector.

It is a further object of the invention to provide a novel solar collector tracking system that is more economical and easier to manufacture than present day solar collector tracking systems that utilize electric drives having high ratio gear reducers to turn the collector in the direction of the sun.

SUMMARY OF THE INVENTION

The novel solar collector tracking system has for its primary structure three hydraulic actuators. The actuators provide the torque to change the collector angle, even in the presence of large wind loads. For the elevation drive, the hydraulic actuator needs only to swing a simple crank arm through ninety degrees. The actuator is double acting, meaning that it can pull as well as push. For the azimuth drive, two double acting hydraulic actuators act upon a single crank arm and are arranged approximately 90 degrees out-of-phase with each other relative to the crank arm angle. In this arrangement, when one of the actuators has little mechanical advantage (near top-dead-center or bottom-dead-center) the other actuator is in its most effective range. By selecting which actuator to extend and which to retract during the rotation, unlimited motion can be achieved.

The solar collector tracking system requires angle sensors. These angle sensors may be one of many types of transducers. In a preferred embodiment it is mounted on the collector, rather than on the actuator. In this location, the transducer's signal directly reports the final output motion that is to be achieved. Backlash and nonlinearity in the transmission and motion may exist without degrading the overall steady state accuracy of the system.

The brains of the solar collector tracking system is the electronic controller that computes the desired angle that the collector should face in order to point at the sun, and monitors the angle sensors that are reporting the angle of the collector. The controller periodically commands the actuators to readjust the angle of the collector to follow the sun. The interval between these periodic adjustments will be very short if great accuracy is required and longer if the tolerance is loose between the desired and reported angles. Depending on the requirements of the collector system, the overall accuracy can be within a very small fraction of a degree.

The controller will also detect when, for instance, the collector is blown off target by wind and can immediately command the actuators to restore the correct attitude. The controller also calculates which of the azimuth drive actuators to extend and retract to achieve the desired motion. This is analogous to "commutation" in electric motors.

In the preferred embodiment, the angular sensors are "incremental" rotary encoders, because of their economical cost. The controller must count the pulses that the encoder produces in order to determine the angular position. The counting is done from a zero reference, which is set by rotating the collector to an "initial" or "zero" attitude which is signaled by another "zero reference" switch or hard stop. A more expensive "absolute" encoder could also be used, which at any instant provides the controller with the angle (without the controller needing to keep a record of previous positions).

Wind is expected to flex the tower. To avoid errors in the detection of the elevation angle that would result from the tower bending, the elevation angle sensor can be configured as an "inclinometer". This is done by attaching the elevation angle sensor to the collector and its shaft to a pendulum which always points directly down. The pendulum must be enclosed to prevent wind from displacing it. The pendulum motion caused by the shaking of the tower must be damped by any of several methods, one of which being magnetic hysteresis.

In the novel solar collector tracking system, the angular position of a collector is detected by sensors that are entirely independent of the actuators. The electronic controller monitors the sensors and commands the actuators to push or pull until the sensors report that the desired angles have been achieved. Thus, inexpensive actuators may be used.

In the preferred embodiment, the actuators are hydraulic. Hydraulic actuators are well known for their usefulness in supplying very large forces. The power unit which supplies high pressure fluid to the actuator may rely on any one of many different pumps. A very small pump is adequate, as the motion to track the sun is very slow. Power to the pump must be great enough to track the sun against the opposing force of a predetermined wind, for example 35 miles per hour.

The entire assembly, or unit, must also endure wind loads that are required by local building codes, such as 70 or 80 miles per hour. The collector, drive system and all structure must be sized to tolerate these loads without damage. The hydraulic drive system of the novel tracking system is also equipped with pressure limiting means that allows it to be back-driven by wind in excess of those required by code. This provides a load-limiting function to prevent damage to the collector, drive or structure. As the drive is being back-driven by the wind, the angle sensors continue to detect the angular position. Then, when a gust of wind has passed, the controller can command the drive to restore the collector to the tracking condition.

The novel tracking system will go into wind stow to avoid damage in winds exceeding those required by building codes. Hydraulic systems reduce the wind stow operation to approximately two minutes duration in time.

The novel solar collector tracking system also has an automatic interconnection in the fluid lines between the azimuth and elevation actuators that will automatically put the elevation drive into wind stow when the azimuth drive is being back-driven by wind. This is a fail-safe system that works independently of the controller. It works even in the event of a power outage or failure in the controller.

Another fail-safe feature that can be incorporated is to store high pressure fluid in a device commonly called an "accumulator". Upon failure of the controller or power outage, the valves connecting the accumulator to the drives would shift automatically to conditions that would put the unit into wind stow. The accumulator in this case should be large enough to power the elevation actuator through full stroke.

DESCRIPTION OF THE PREFERRED EMBODIMENT

The solar collector tracking system is generally designated numeral 14 and it will be described by referring to FIGS. 1–10 of the drawings.

Figure 1:
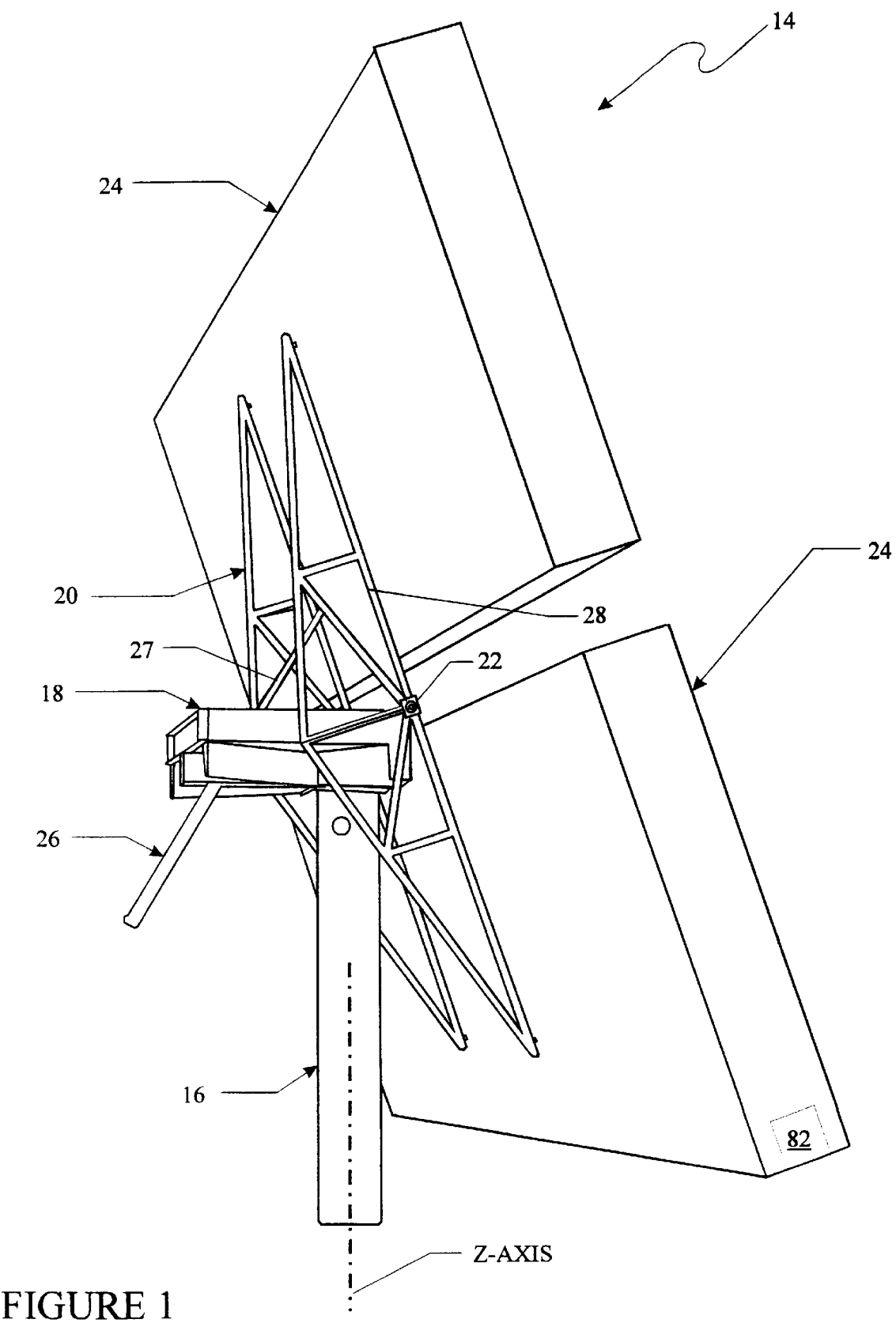
FIG. 1 is a rear perspective view of the novel solar collector tracking system with the elevation actuator mostly extended.

In FIG. 1, the solar collector tracking system is shown as it would be tracking the rays of the sun. It has a vertically oriented tower 16 having a vertically oriented Z-axis. The bottom end of tower 16 would be mounted in a foundation in the ground (not shown). Journaled on the top end of tower 16 is an azimuth platform assembly 18. A pair of laterally spaced exoskeleton frames 20 are pivotally mounted on bearings 22 connected to the front end of azimuth platform assembly 18. Bearings 22 have a horizontal K-axis. A pair of solar collection devices 24 are secured to the respective exoskeleton frames 20. Mounted on the front surface of solar collection devices 24 are a plurality of lens assemblies for collecting sun rays that are utilized to produce electricity.

Figure 2:
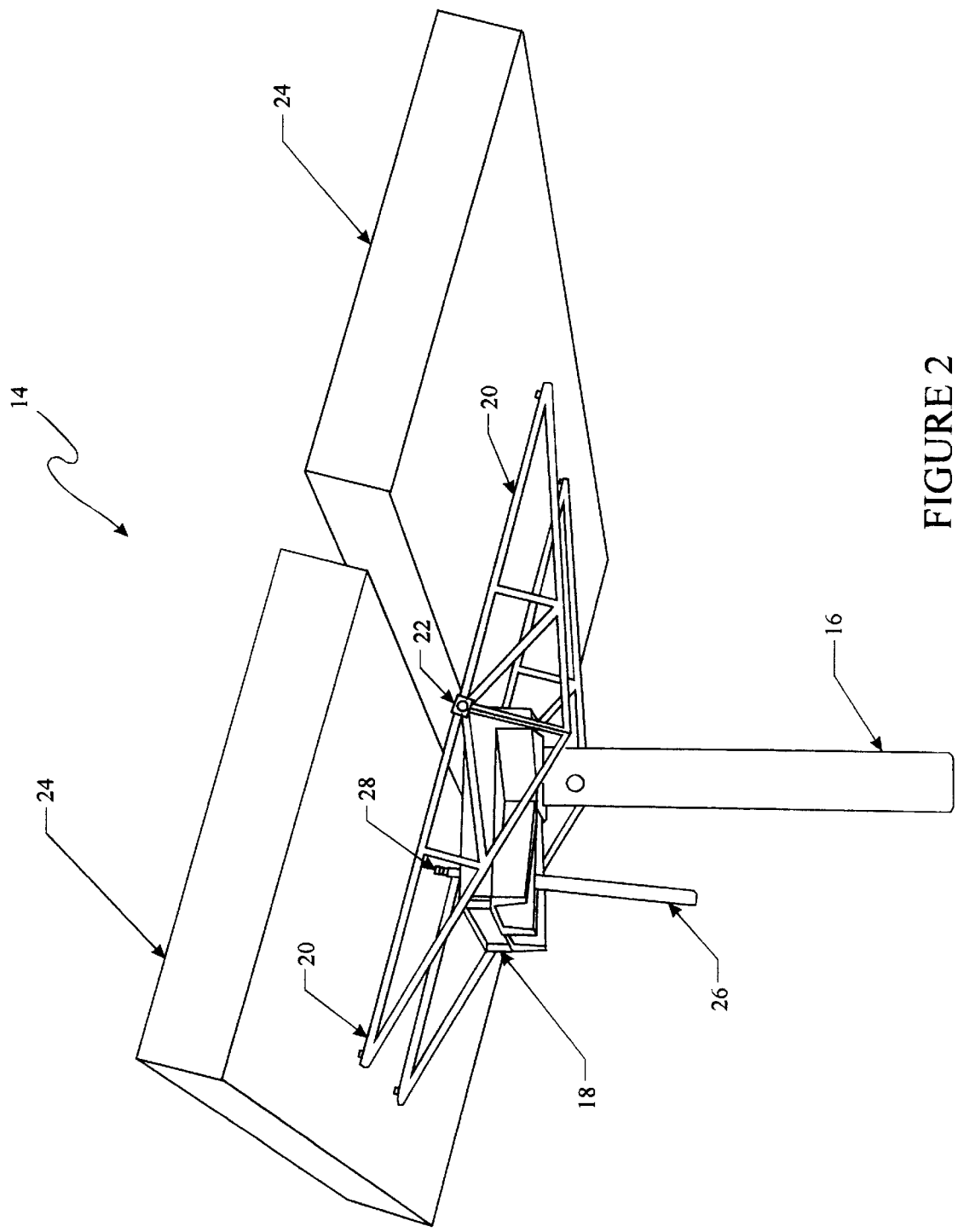
FIG. 2 is a rear perspective view of the solar collector tracking system with the elevation actuator mostly retracted.

A hydraulic elevation actuator 26 has a piston rod 27 whose front end is pivotally connected to a bracket 28 mounted on the rear surface of the upper solar collection device 24. FIG. 2 shows the solar collector tracking system when the piston rod 27 of hydraulic elevation actuator 26 has been retracted to position the collection device 24 in the "wind stow" position.

Figure 3:
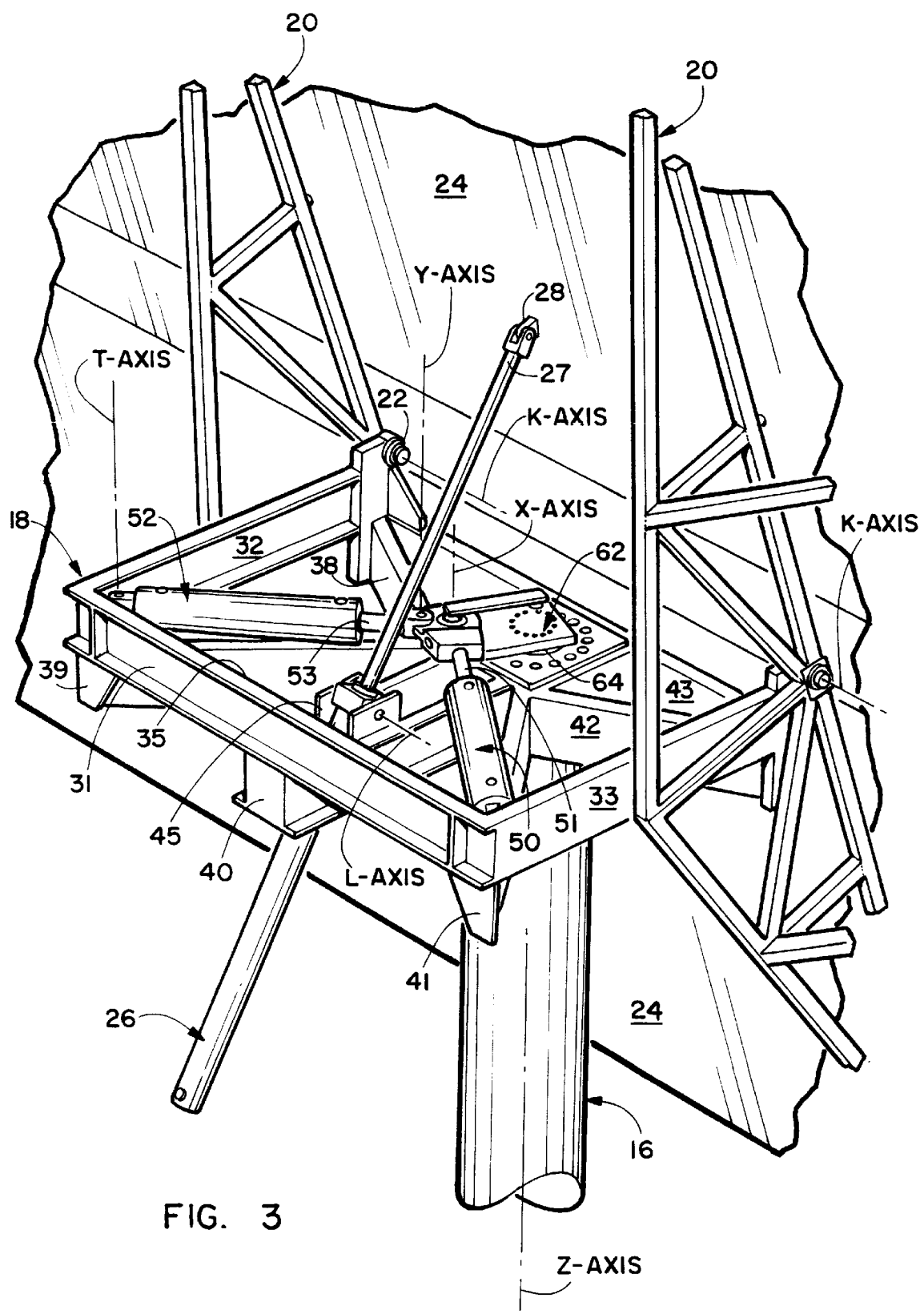
FIGS. 3, 4 and 5 illustrate the actuators inside the azimuth platform assembly. In the sequence of the three Figures, the azimuth platform is being rotated counter-clockwise by the azimuth actuators-while the observer, tower and the drive head are "stationary"
Figure 4:
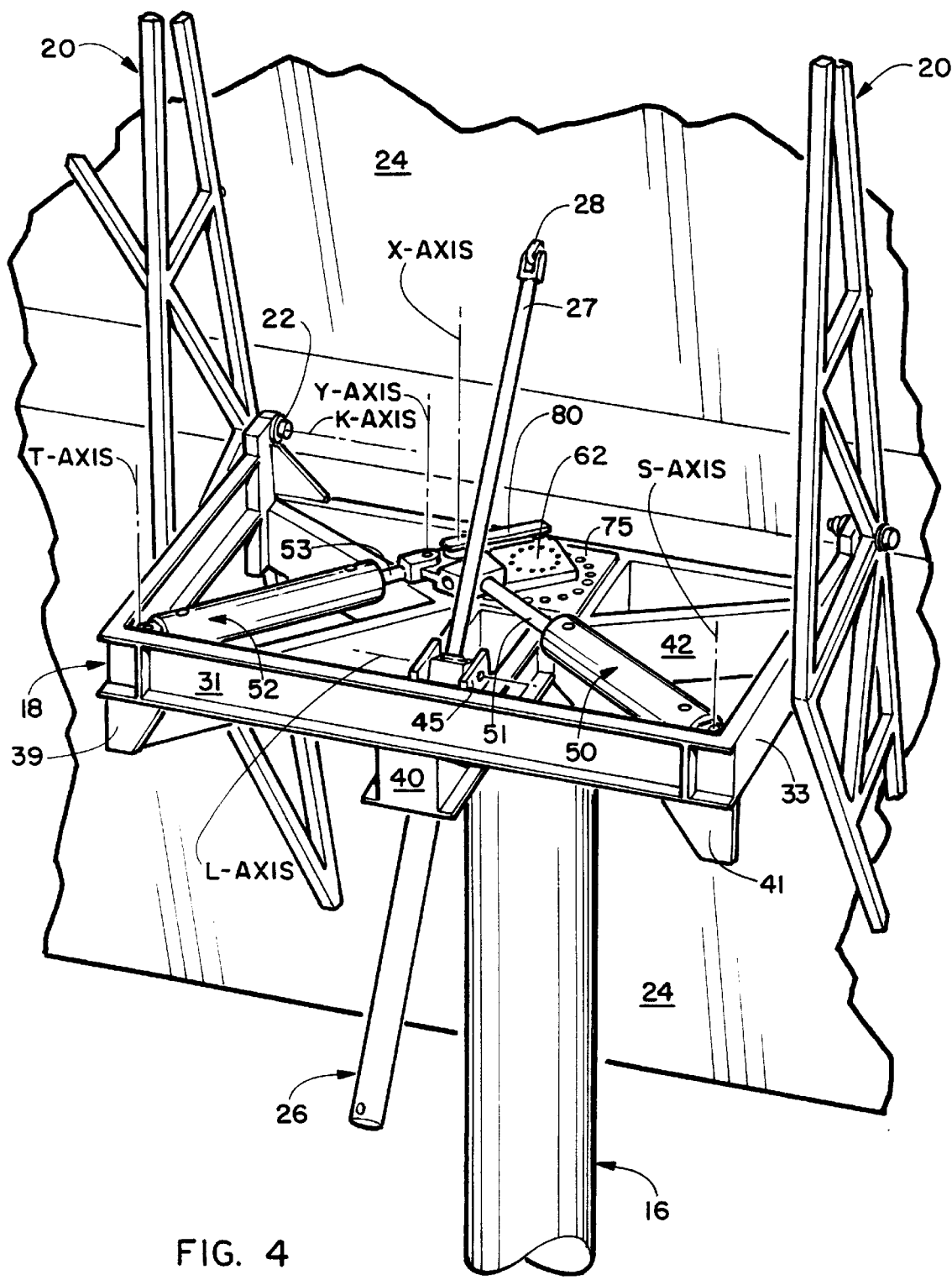
Figure 5:
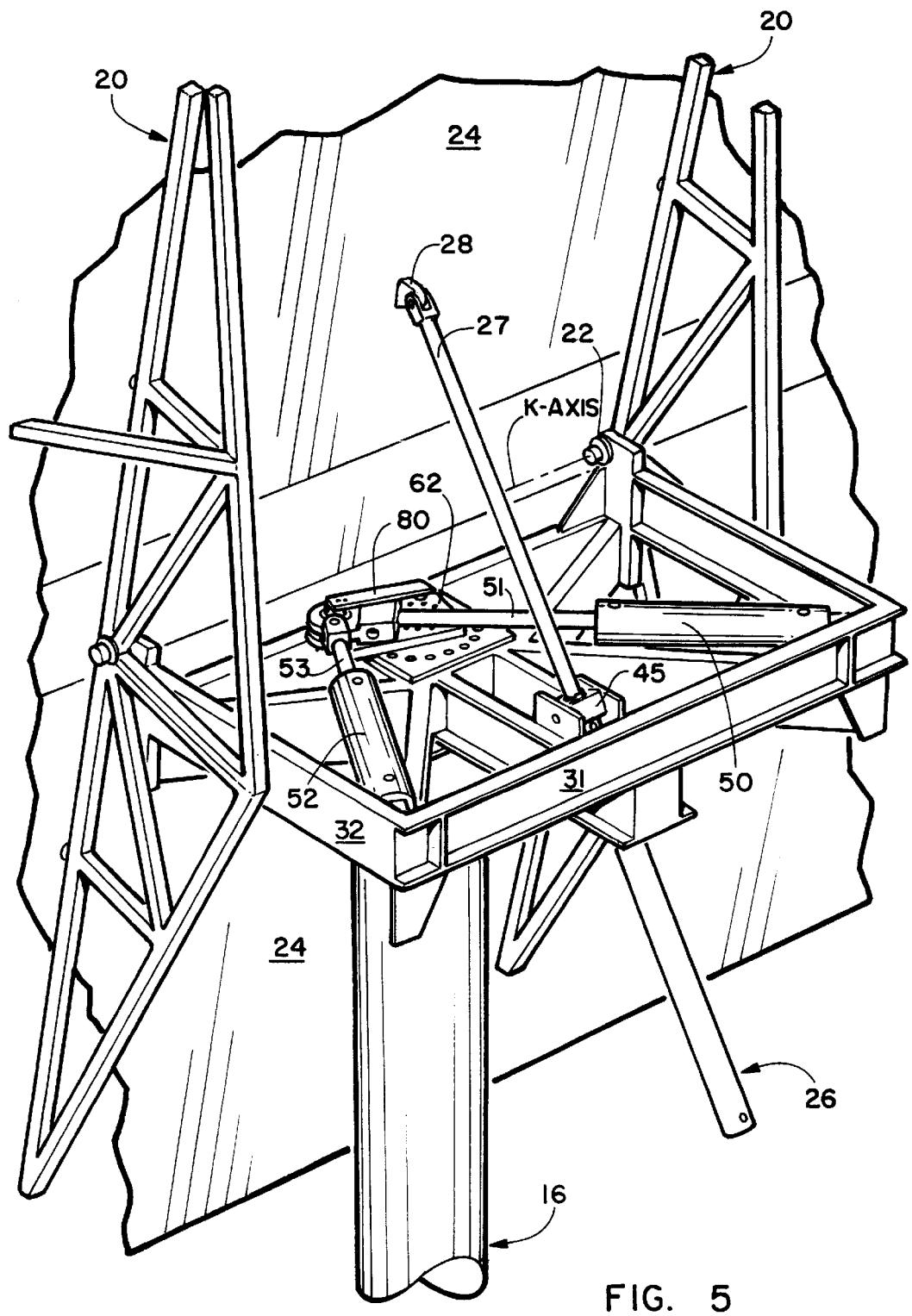

The structure of azimuth platform assembly 18 is best illustrated by referring to FIGS. 3–5 of the drawings. Azimuth platform assembly 18 has a front structural beam 30, a rear structural beam 31, a left side structural beam 32 and a right side structural beam 33. These respective structural beams form a major frame having an open central chamber 35 for housing the structural members used to rotate azimuth platform assembly 18 about the vertical Z-axis of tower 16. Structural brace members 38–43 add structural strength to azimuth platform assembly 18. Double-acting hydraulic elevation actuator 26 is pivotally supported by brackets 45 secured to brace member 40. The top end of hydraulic elevation actuator 26 pivots about a horizontal L-axis passing through brackets 45 as piston rod 27 causes the solar collection devices 24 to travel from an upright position to a stored horizontal position.

Primary azimuth actuator 50 and secondary azimuth actuator 52 are both double-acting hydraulic actuators. They have the respective drive shafts 51 and 53. The rear end of primary azimuth actuator 50 has a bracket 55 that is connected to azimuth platform assembly 18 in its one corner by a vertically oriented pin 56. Secondary azimuth actuator 52 has a bracket 58 secured to its rear end that is connected by a vertical pin 59 to the azimuth platform assembly 18.

Drive head 62 always remains stationery and it is secured to the top end of tubular post 64. The specific structure of drive head 62 is best understood by referring to FIG. 7. Drive head 62 is rigidly connected to tower cap 66 by tubular post 64. One end of drive head 62 has a rigid pivot pin 68 having a vertically oriented Y-axis extending upwardly from its surface. Journaled on pin 68 is connecting link 70 that is secured to the front end of piston rod 51. A bifurcated bracket 72 is secured to the front end of piston rod 53 and it is pivotally secured to connecting link 70 about a vertically oriented X-axis.

The structural brace members 38–43 extend radially inwardly until they connect with a box shaped housing 74 having a top wall 75. Turntable bearing 77 rotatably mounts housing 74 and the respective remaining structure of azimuth platform assembly 18 on tower cap 66. An encoder support arm 80 has its one end rigidly connected to pivot pin 68 and its other end receives an encoder 81 that is rigidly positioned on the vertically oriented Z-axis of tower 16. A drag arm 90 has an encoder shaft 79 extending downwardly into encoder 81. The other end of drag arm 90 has a slot 92 that slips over a pin 94 extending upwardly from azimuth platform assembly 18.

Figure 6:
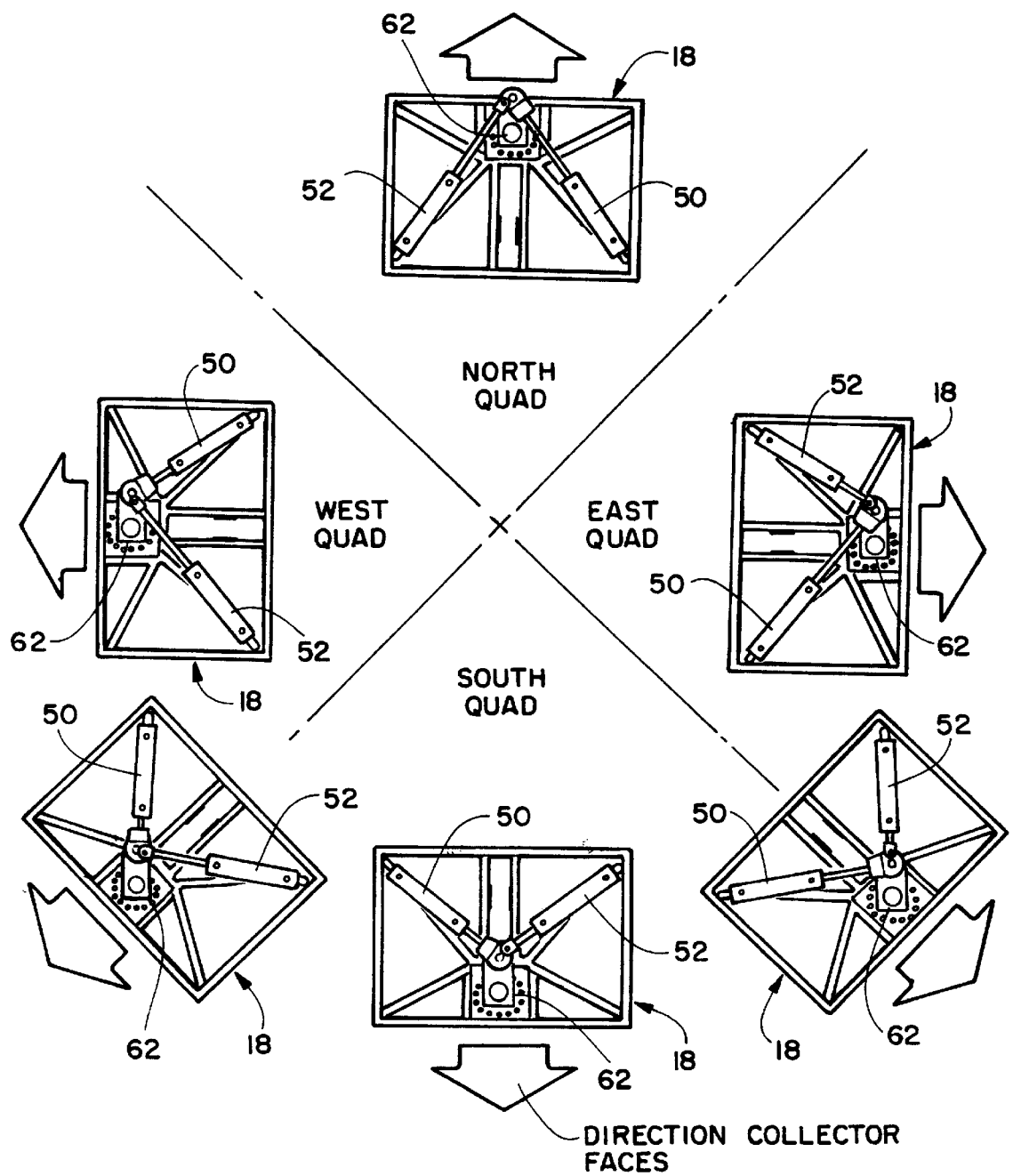
FIG. 6 shows additional views of the azimuth platform assembly and the azimuth actuators at other azimuth angles.
Figure 7:
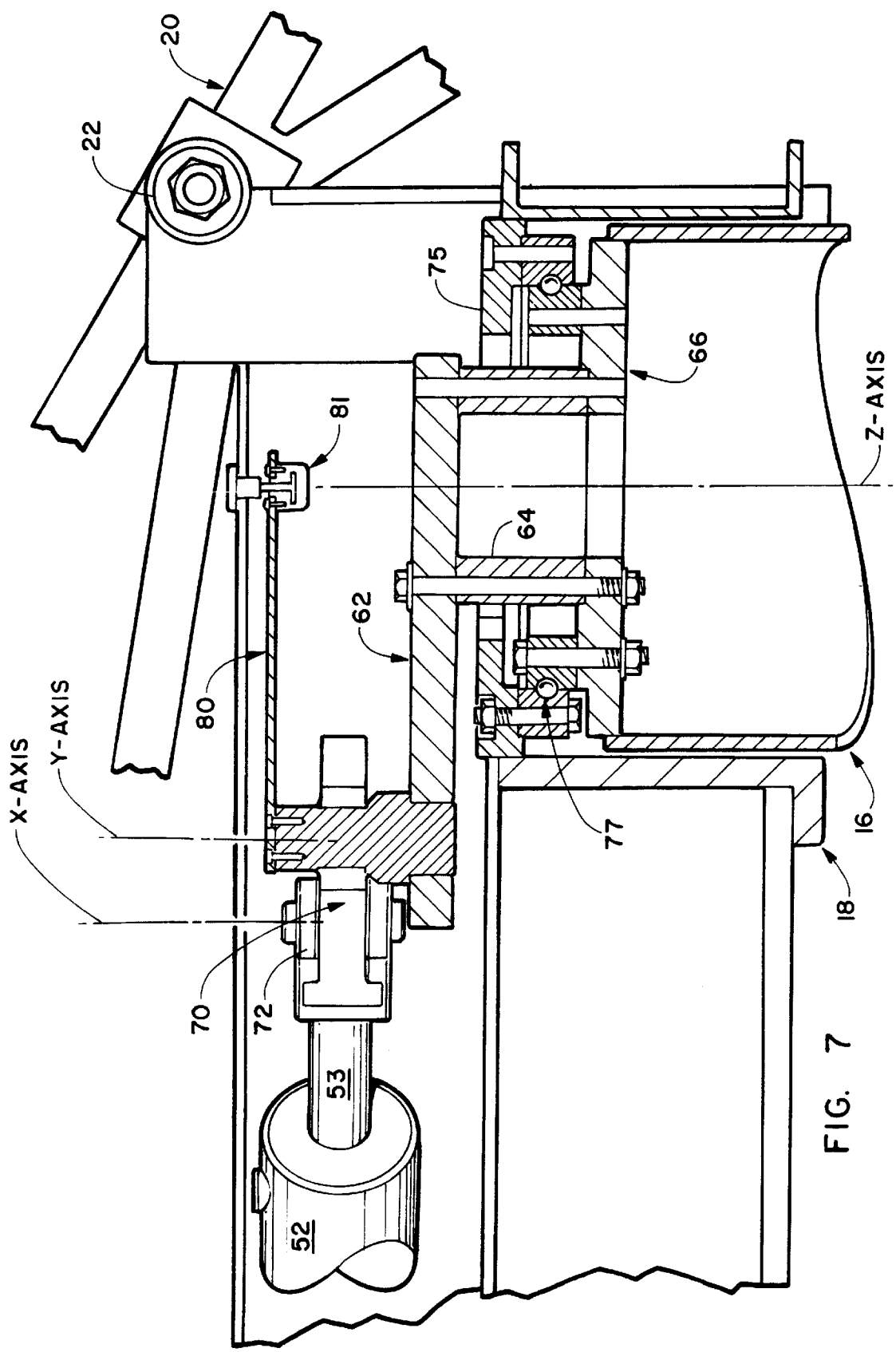
FIG. 7 shows a cross-sectional view through the bearing about which the azimuth platform assembly pivots.
Figure 8:
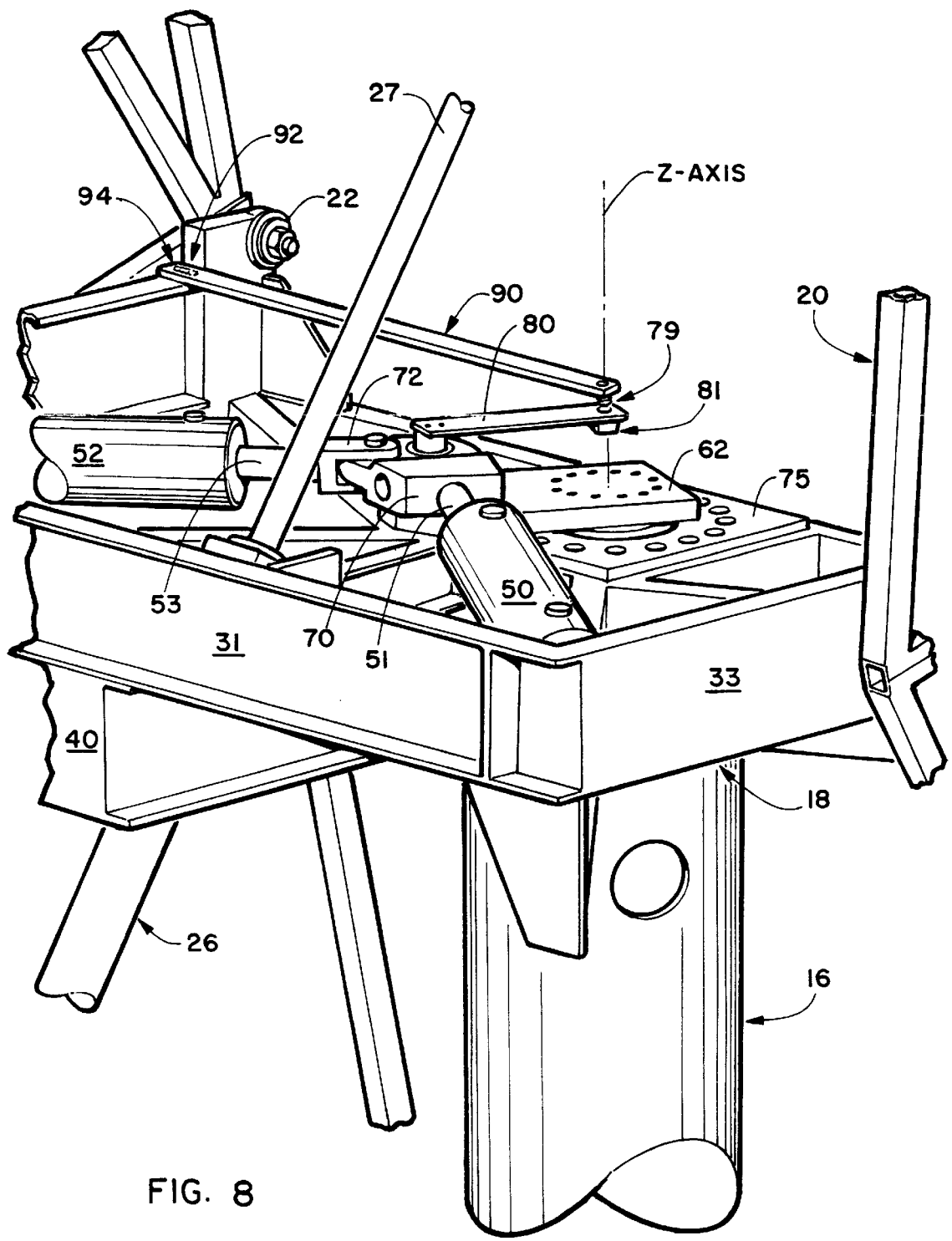
FIG. 8 shows a drag link rigidly attached to the encoder shaft.

FIG. 6 shows additional views of azimuth platform assembly 18 and the azimuth actuators 50 and 52 at other azimuth angles. At some angles, one actuator is near "top-dead-center" or "bottom-dead-center" relative to drive head 62 and can offer little torque, while at the same time the other actuator is at an angle that offers the greatest mechanical advantage. At other angles, both actuators may share more-or-less equally. It can be understood by studying FIG. 6 that continuous, multi-turn high-torque rotation of the azimuth platform assembly 18 may be obtained by properly sequencing the extension or retraction of each azimuth actuator.

Figure 9:
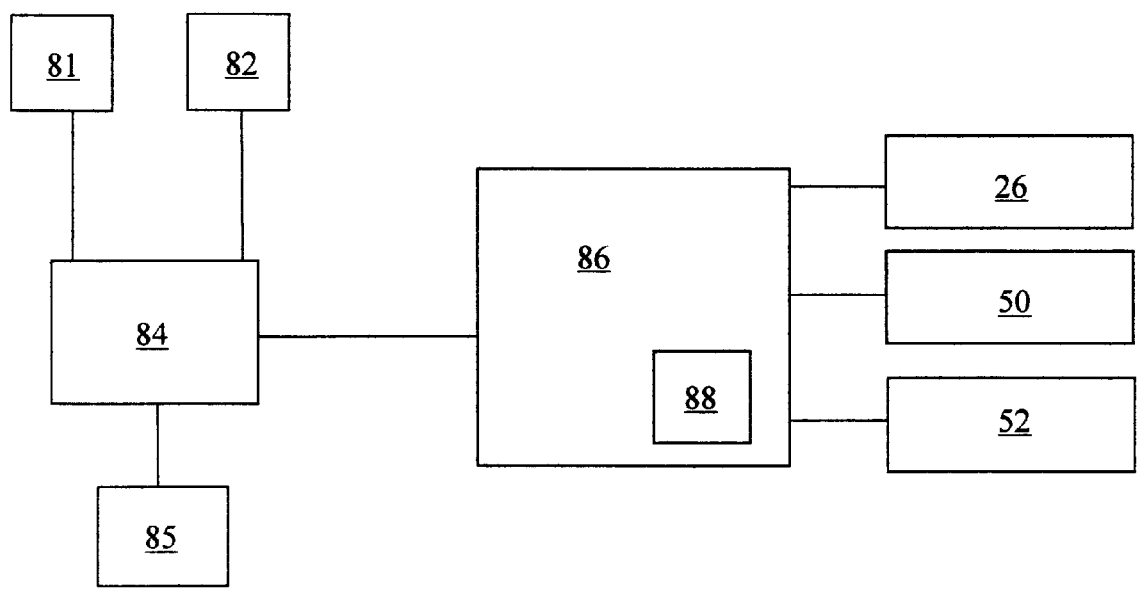
FIG. 9 is a schematic block diagram of the electrical and hydraulic system of the solar collector tracking system.

The hydraulic actuators of the solar collector tracking system are controlled by an electronic controller 84 (see FIG. 9). Azimuth encoder 81 and elevation encoder 82 are monitored by electronic controller 84 that has an electrical power source 85. Signals are sent to hydraulic power unit 86 that has an accumulator 88 in its system. Upon directions from electronic controller 84, hydraulic fluid is directed to the respective hydraulic actuators 26, 50 and 52 in order to change the azimuth orientation and elevation of the solar collection devices 24. The electronic controller knows precisely the angle of azimuth platform assembly 18 because it monitors encoder 81.

Hydraulic power units and hydraulic actuators can provide the very great torques that are necessary to overcome wind loads that solar collectors may be subjected to. Motion of a sun tracking collector is very slow when it is tracking the sun. At other times the collector must be swung more rapidly to put it into the wind stow attitude. Rapid traverse is also desired for morning and evening and in the tropics for an event that occurs near noon when the sun is passing nearly directly overhead. The azimuth drive must swing 180 degrees as quickly as possible.

Figure 10:
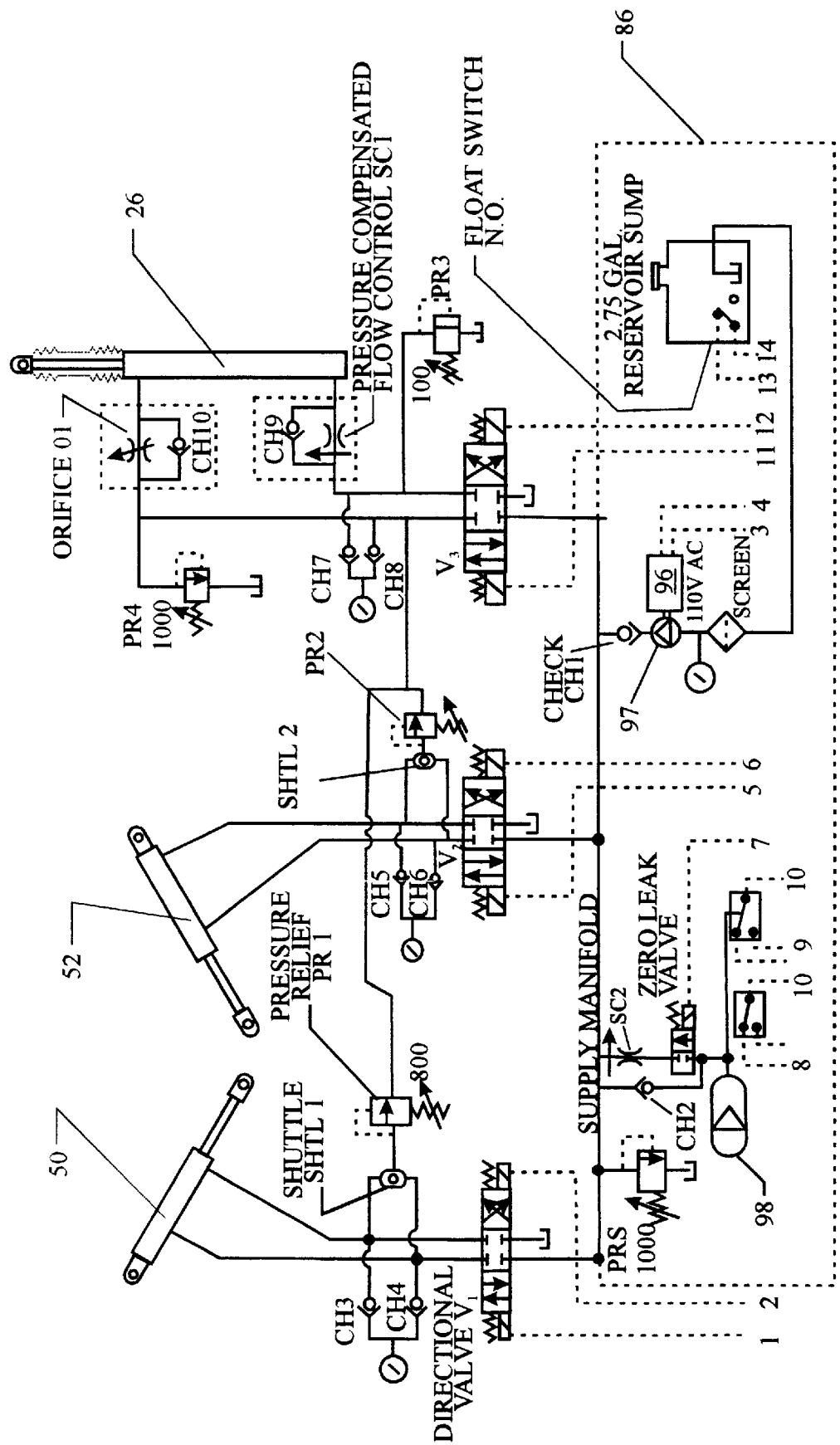
FIG. 10 is a schematic diagram of the hydraulic control system.

As seen in FIG. 10, one hydraulic power unit 86 is used to deliver fluid to the azimuth actuators 50 and 52 and the elevation actuator 26. The hydraulic power unit 86 uses a very small motor 96 and pump 97 for slow tracking of the collector against the required wind load. An accumulator 98 is added to store high pressure fluid for the times when rapid travel is required. Starting and stopping the motor and pump every few seconds is not advisable, so the hydraulic system has been configured so that the pump can be run less frequently using it just to charge the accumulator. Charging is required only about 40 times on an average day, even with a small one quart accumulator. The accumulator is then used as the source of pressure during the frequent tiny jogs that are required for sun tracking.

During charging of the accumulator, fluid goes from the pump to the supply manifold and then to the accumulator. The valves are closed during charging except for the automatic action of the spring-loaded check valves (CH1 and CH2) that let fluid flow unobstructed to the accumulator. During tracking, the fluid comes out of the accumulator to the supply manifold but must go through a speed control valve SC2, which slows the flow as much as required (it is adjustable). From the supply manifold, the flow goes through the energized directional control valve to the actuators.

Another feature of the hydraulic system is plumbing to automatically retract the elevation actuator if the azimuth actuators are being back-driven by a dust devil. This occurs even without the intervention of the controller. When wind-induced torque on the azimuth drive causes pressure to exceed 900 PSIG (the sum of pressure release valves PR1 (or PR2) and PR3 in series, the azimuth actuators start to act as pumps to drive fluids to the head end of the elevation actuator, retracting it. A pressure-compensated speed control SC1 on the cap end of the elevation drive prevents the elevation drive from being retracted too quickly.

If SC1 must throttle the flow, the pressure and the azimuth actuators will rise beyond 900 psig, but only to 1800 psig, when some fluid begins to be diverted by pressure release valve PR4 to the sump (pressure drop across release valves in series is analogous to voltage drop across resistors in series, thus total pressure in the azimuth actuators equals 800+1000=1800). This pressure relief (together with the automatic wind stow) provides a safe upper limit of 50,000 ft. lbs. of torque that can be reacted by the azimuth drive, thus avoiding the destruction of the PV unit by rogue winds like dust devils. High speed mode is enabled by running the pump motor while energizing the appropriate directional control valves.

The alternative embodiment of the solar collecting tracking system is generally designated numeral 114 and it will be described by referring to FIGS. 11–15 of the drawings.

Figure 11:
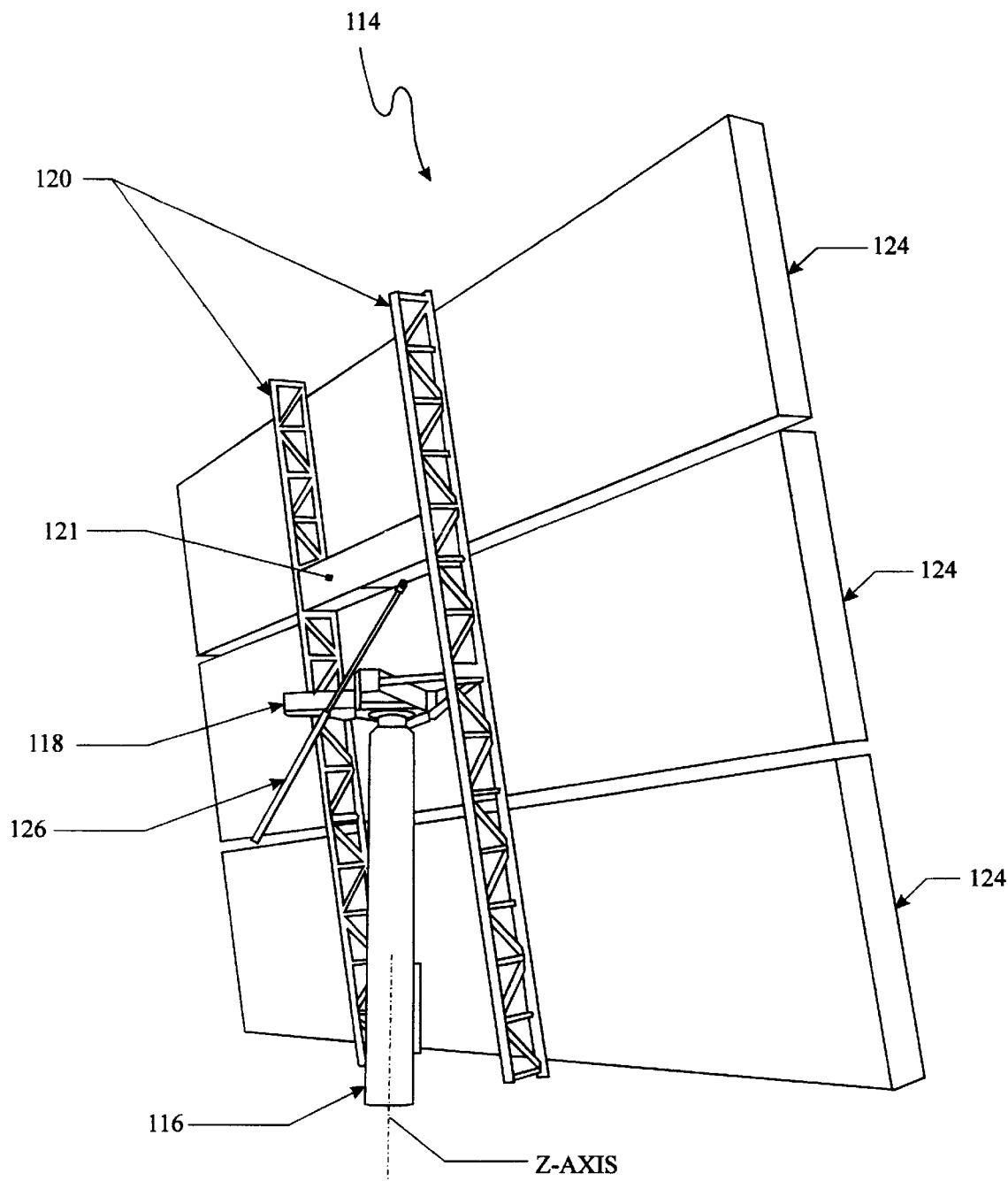
FIG. 11 is a rear perspective view of an alternative embodiment of the novel solar collector tracking system with the elevation actuator mostly extended.

In FIG. 11, the solar collector tracking system is shown as it would be tracking the rays of the sun. It has a vertically oriented tower 116 having a vertically oriented Z-axis. The bottom end of tower 116 would be mounted in a foundation in the ground (not shown). Journaled on the top end of tower 116 is an azimuth platform assembly 118. A pair of laterally spaced trusses 120 are pivotally mounted on bearings 122 connected to the front end of azimuth platform assembly 118. Bearings 122 have a horizontal axis. A plurality of solar collection devices 124 are secured to the respective truss members 120. A torque tube 121 keeps the trusses parallel as well as provides an attachment point for the piston rod of the elevation actuator. Mounted on the front surface of solar collector devices 24 are a plurality of lens assemblies for collecting sun rays that are utilized to produce electricity.

Figure 12:
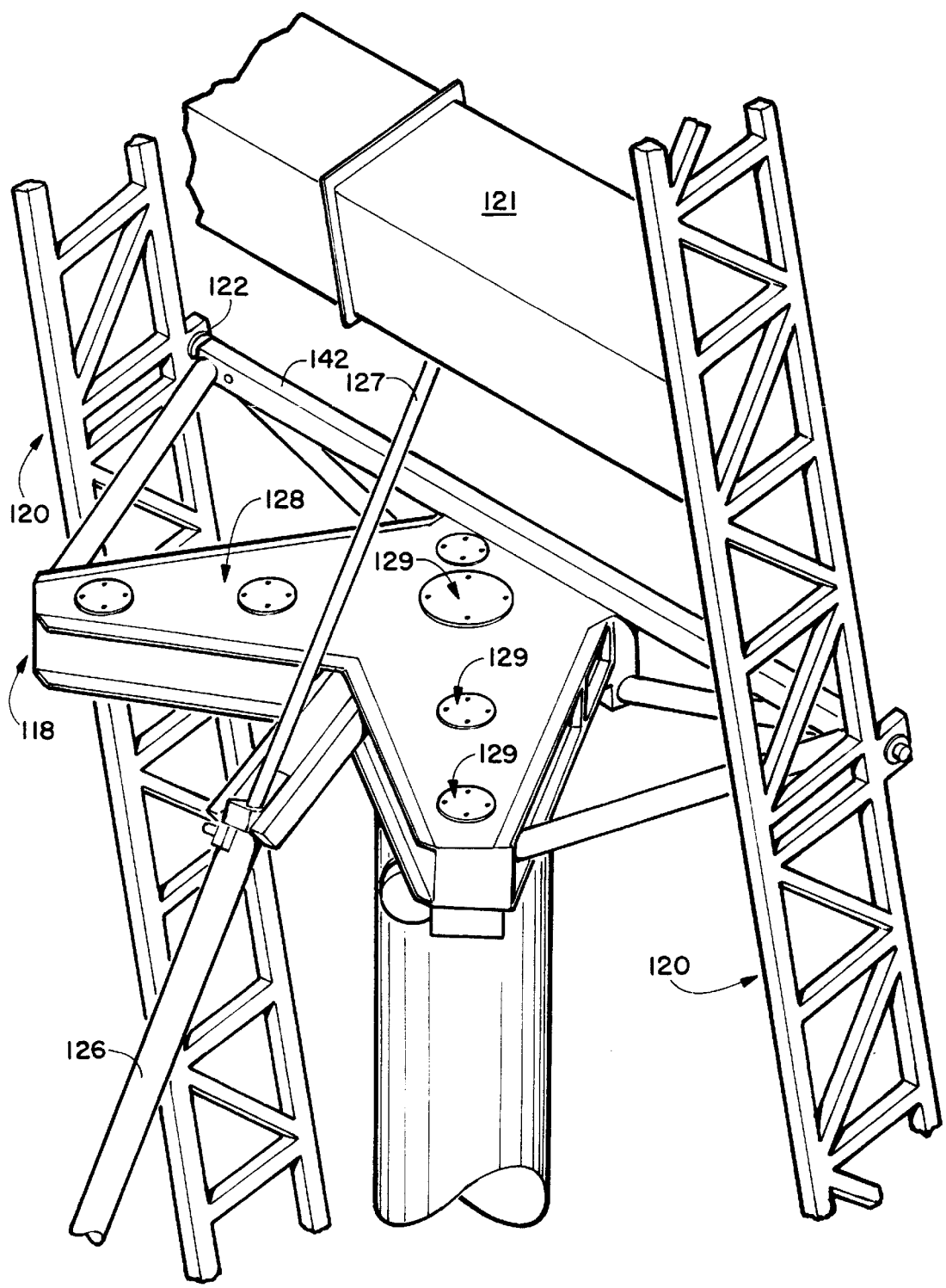
FIG. 12 is an enlarged rear perspective view of the alternative embodiment of the azimuth platform assembly.

Referring to FIG. 12, hydraulic elevation actuator 126 has a piston rod 127 whose front end is pivotally connected to a bracket mounted on the bottom surface of torque tube 121. Azimuth platform assembly 118 has a top cover plate 128 that is welded to the top of the platform assembly to increase stiffness and strength to give it greater efficiency. Removable covers 129 are provided to allow access to the interior of the open central chamber 135.

Figure 13:
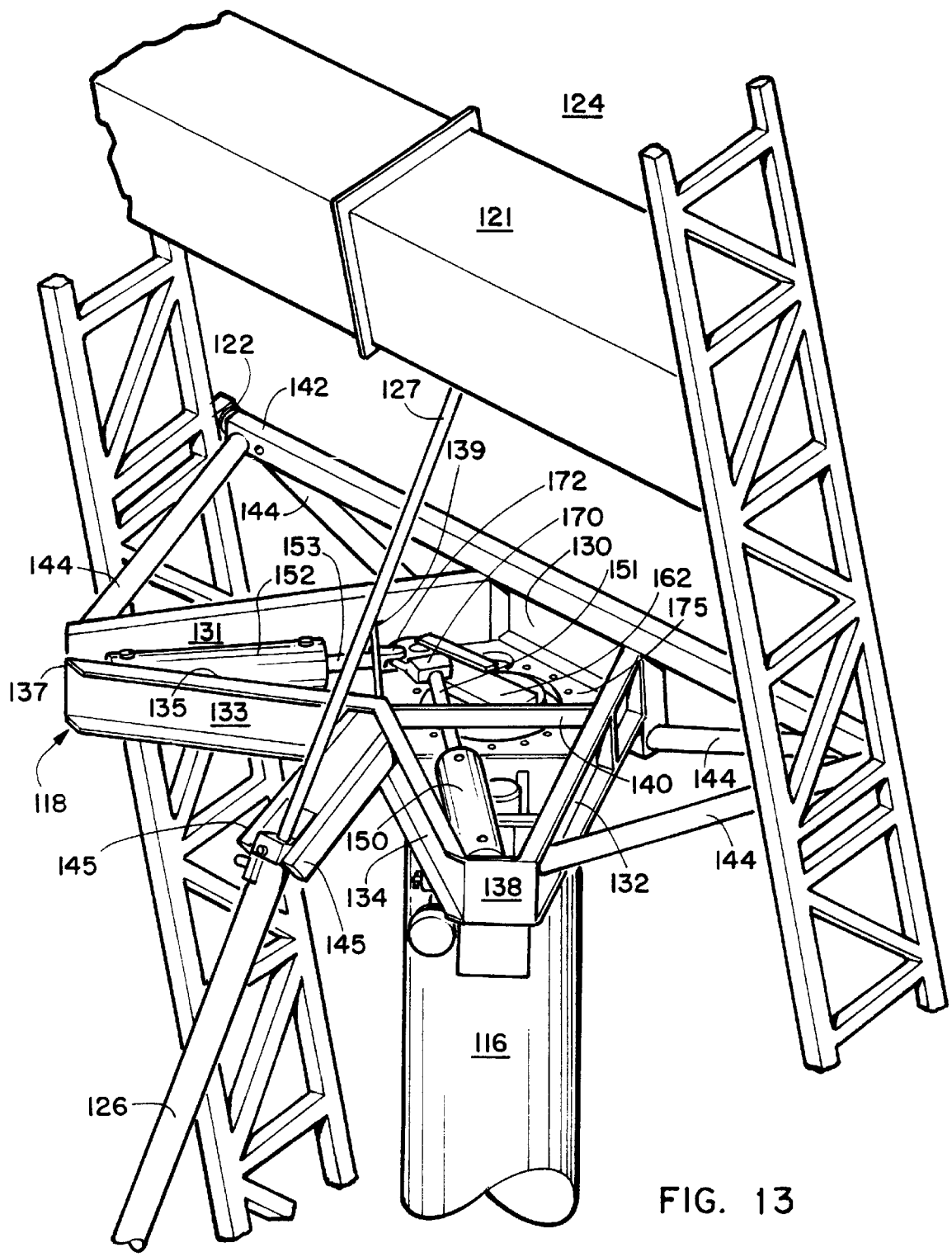
FIG. 13 shows the azimuth platform assembly of FIG. 12 with its cover plate removed.
Figure 14:
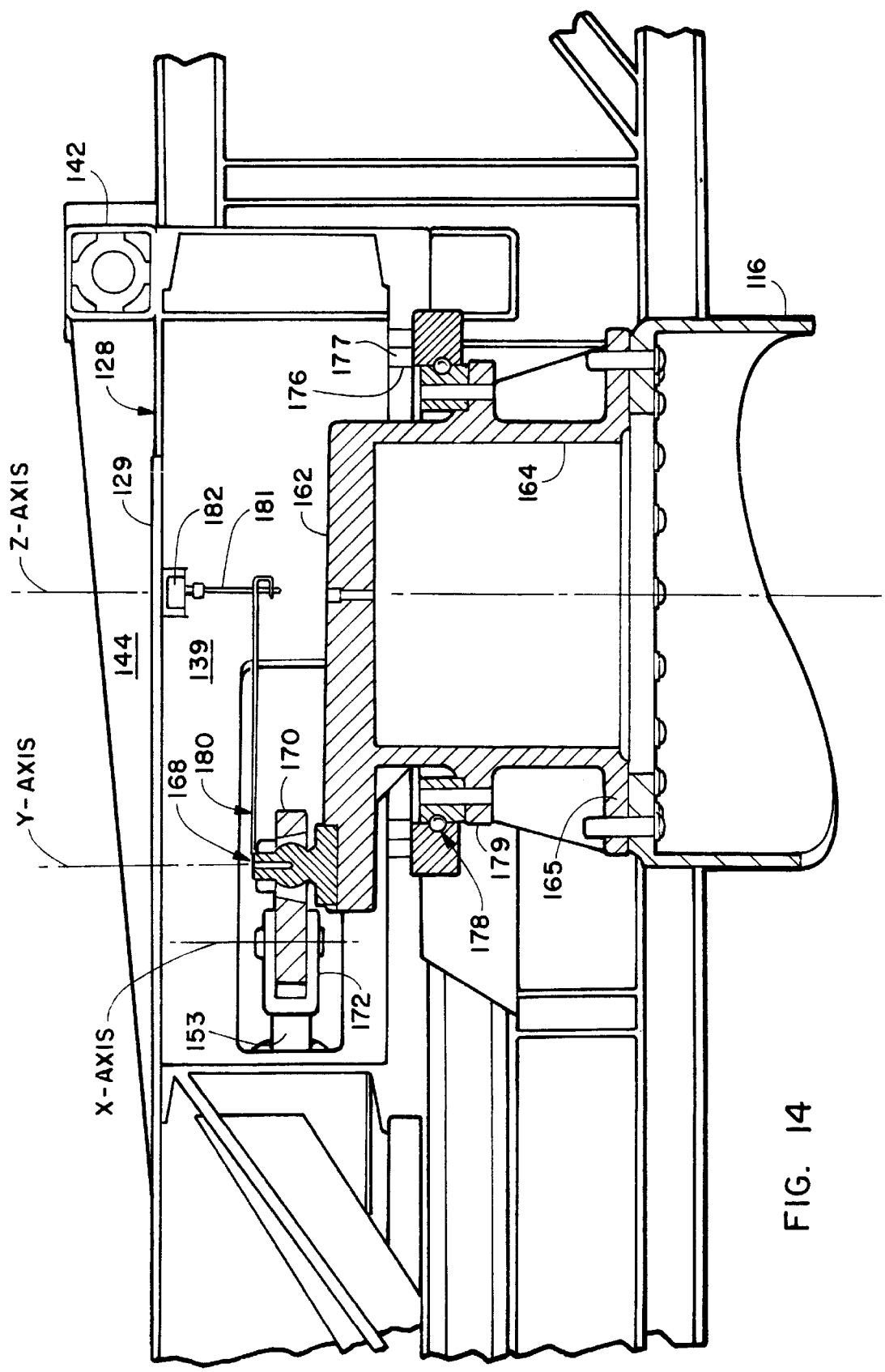
FIG. 14 is a cross-sectional view through the turntable bearing about which the azimuth platform assembly pivots.

In FIG. 13, cover plate 128 has been removed from the azimuth platform assembly in order to properly to describe its structure and the components mounted therein. Azimuth platform assembly 118 has a front structural beam 130, a left side structural beam 131, a right side structural beam 132 and a pair of rear structural beams 133 and 134. These respective structural beams form a major frame having an open central chamber 135 for housing the structural members used to rotate azimuth platform assembly 118 about the vertical Z-axis of tower 116. End plates 137 and 138 and structural brace members 139 and 140 add structural strength to azimuth platform assembly 118. Cross member 142 is connected to the top surface of front structural beam 130 and its opposite ends are journaled to structure on the respective trusses 120. A plurality of brace members 144 are connected between azimuth platform assembly 118 and cross member 142 to provide additional structural integrity.

Double-acting hydraulic elevation actuator 126 is pivotally supported by a pair of laterally spaced arms 145 extending outwardly from rear structural beams 133 and 134. The top end of hydraulic elevation actuator 126 pivots about a horizontal axis passing through arms 145 as piston rod 127 causes the solar collection devices 124 to travel from an upright position to a stored horizontal position.

Primary azimuth actuator 150 and secondary azimuth actuator 152 are both double-acting hydraulic actuators and they have the respective drive rods 151 and 153. The rear end of primary azimuth actuator 150 has a bracket that is connected to azimuth platform assembly 118 in one of its corners by a vertically oriented pin. Second azimuth actuator 152 has a bracket secured to its rear end that is connected by a vertical pin to the azimuth platform assembly 118.

Drive head 162 always remains stationary and it is secured to the top end of tubular post 164. In the embodiment illustrated in FIG. 14 they are formed as a unitary member. The bottom end of tubular post 164 has a radially extending annular flange 165 that is rigidly connected to the top end of tower 116. One end of drive head 162 has a rigid pivot pin 168 having a vertically oriented y-axis extending upwardly from its center. Journaled on pin 168 is connecting link 170 that is secured to the front end of piston rod 151. A bifurcated bracket 172 is secured to the front end of piston rod 163 and it is pivotally secured to connecting link 170 about a vertically oriented X-axis.

A bottom wall 177 is welded to azimuth platform assembly 118 between the respective structural beams 130–134. Tubular post 164 extends upwardly through an aperture 176 in bottom wall 177. Turntable bearing 178 is connected between bottom wall 177 and an annular flange 179 on tubular post 164 thus making azimuth platform assembly 118 rotatable on the top end of tower 116. An encoder support arm 180 has its one end rigidly connected to pivot pin 168 and its other end receives a flexible shaft 181 whose top end is connected to encoder 182. Encoder 182 is rigidly positioned on the bottom of removable cover 129 and it is positioned on the vertically oriented Z-axis of tower 116.

Figure 15A:
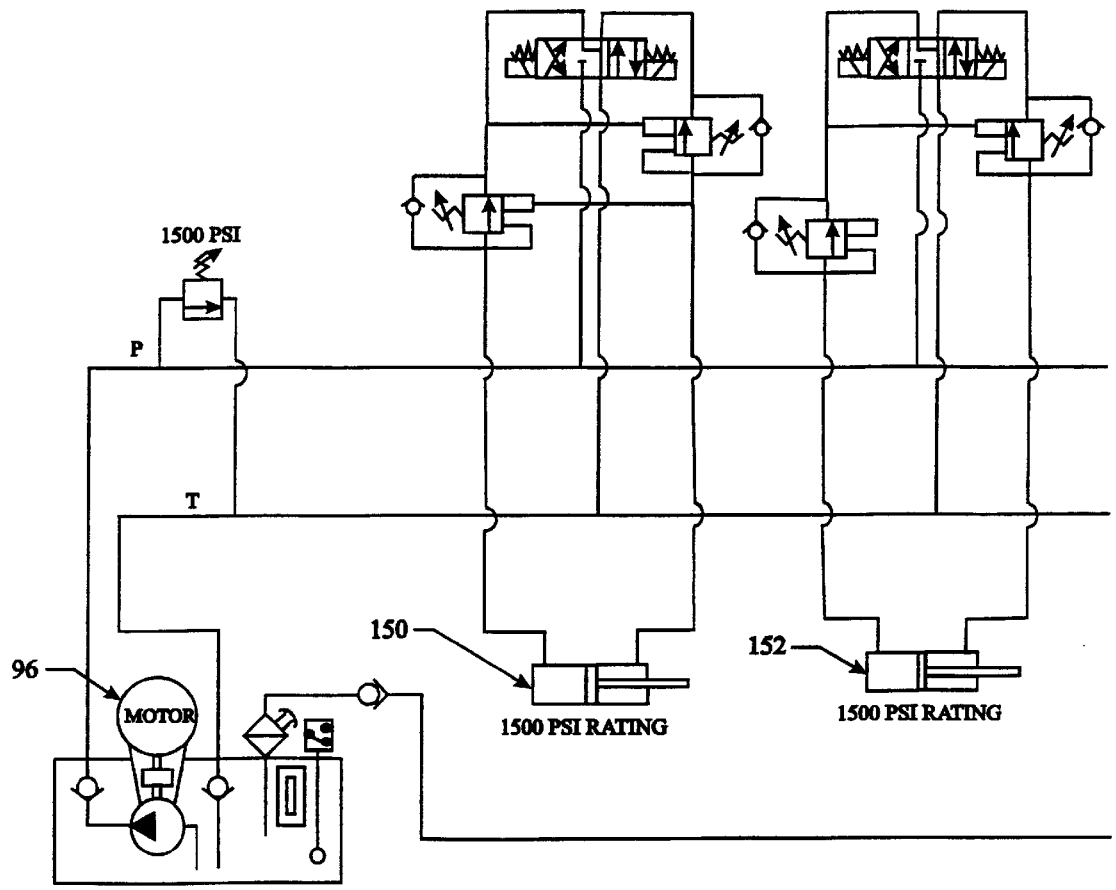
FIGS. 15A and 15B combined is a schematic diagram of the hydraulic control system of the alternative embodiment.
Figure 15B:
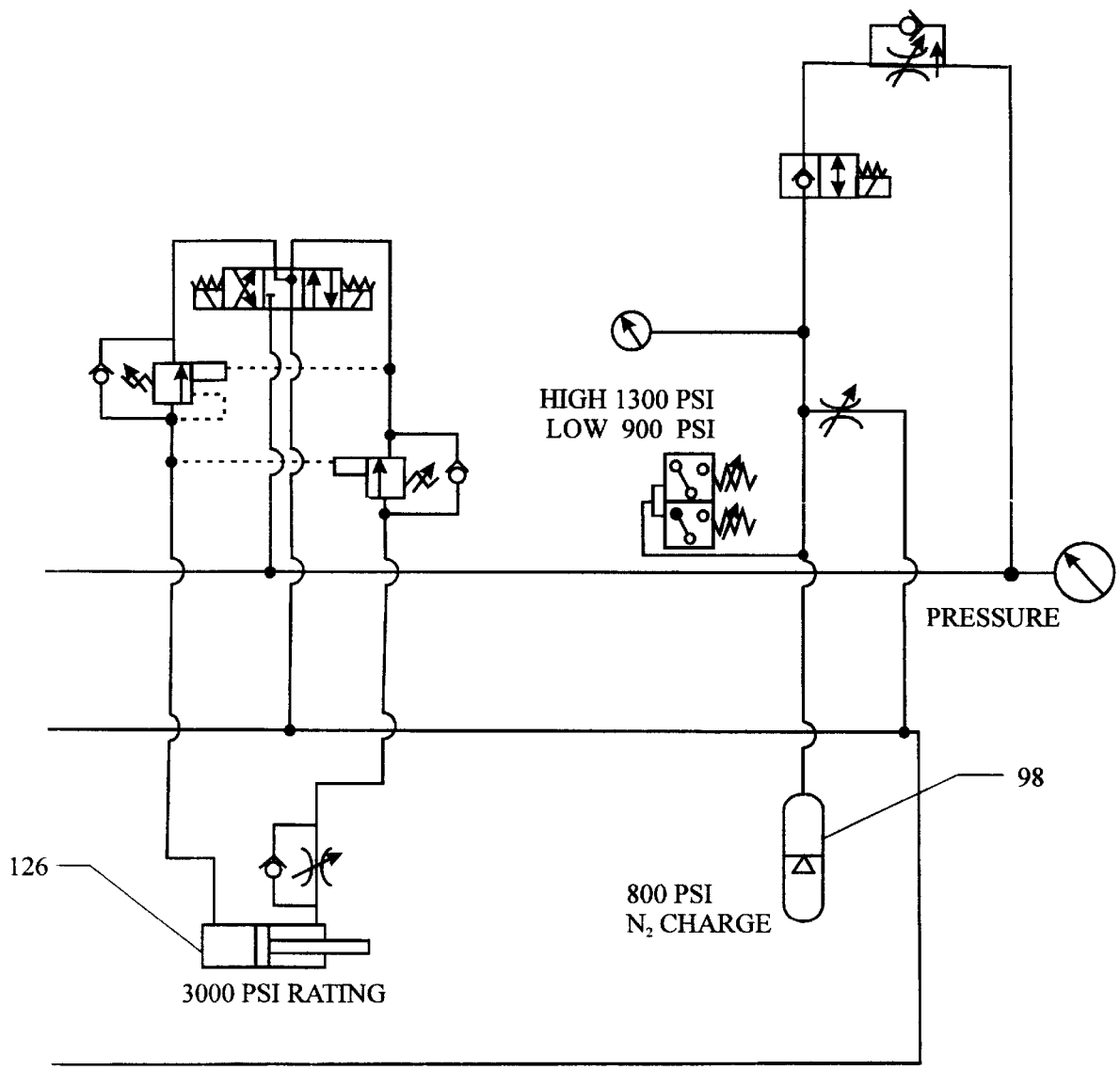

Combined FIGS. 15A and 15B illustrate a schematic diagram of the hydraulic power system used with the alternative embodiment of the solar collector tracking system.

What is claimed is:

1. A solar collector tracking system comprising:

an elongated vertically oriented tower having a vertically oriented Z-axis, a top end and a bottom end; a tower cap rigidly secured to said top end of said tower;

a horizontally oriented azimuth platform assembly formed by a front structural beam, a rear structural beam, a left side structural beam and a right side structural beam; said respective structural beams define a major frame having an open central chamber for housing structural members used to rotate said azimuth platform assembly about said vertical Z-axis;

an elongated drive head having a top surface, a bottom surface, an inner end and an outer end; a tubular post is rigidly secured to said bottom surface of said drive head adjacent said inner end; said tubular post being rigidly connected to said tower cap; a rigid pivot pin having a vertical X-axis extends upwardly from said top surface of said drive head adjacent said outer end;

a horizontally oriented primary azimuth hydraulic actuator having a front end, a rear end, and a primary piston rod having a front end; a connecting link is rigidly secured to said front end of said primary piston rod and said connecting link is journaled on said pivot pin that is located adjacent said outer end of said drive head; said rear end of said primary azimuth hydraulic actuator being pivotally secured to the interior of said major frame about a vertically oriented S-axis;

a horizontally oriented secondary azimuth hydraulic actuator having a front end, a rear end, and a secondary piston rod having a front end; a bifurcated coupling is rigidly secured to said front end of said secondary piston rod and said bifurcated coupling is pivotally secured to a vertically oriented pin passing through said connecting link, said pin having a vertical y-axis that is laterally spaced from said X-axis of said pivotal pin; said rear end of said secondary azimuth hydraulic actuator being pivotally secured to the interior of said major frame about a vertically oriented T-axis;

means journaling said azimuth platform assembly on said top end of said tower;

at least one solar collection device having a front surface and a rear surface;

means pivotally securing said solar collection device to said front end of said azimuth platform assembly so that said solar collection device can be pivoted about a horizontal axis from a vertical operating position to a horizontal storage position; said means comprising a hydraulic activator having a front end, a rear end and a piston rod; a bracket is mounted on the front end of said piston rod and said bracket is pivotally secured to said rear surface of said collection device; said front end of said elevation actuator is pivotally mounted in said azimuth platform assembly.

2. A solar collector tracking system as recited in claim 1 further comprising an elongated encoder support arm having a predetermined length, a front end and a rear end; said rear end is rigidly secured to the top end of said pivot pin extending upwardly from said top surface of said drive head; an encoder is mounted in said front end of said support arm and it is axially aligned with said Z-axis of said tower.

3. A solar collector tracking system as recited in claim 2 wherein said encoder has a shaft extending upwardly from the front end of said encoder support arm and further comprising an elongated drag link member having a front end and a rear end; said rear end being secured to said azimuth platform assembly and said front end supporting said encoder shaft.

4. A solar collector tracking system as recited in claim 2 further comprising a hydraulic power unit having a supply manifold and means connecting said primary azimuth actuator, said secondary azimuth actuator and said elevation actuator to said supply manifold of hydraulic power unit.

5. A solar collector tracking system as recited in claim 4 further comprising an accumulator in said hydraulic power unit connected to said supply manifold.

6. A solar collector tracking system as recited in claim 4 further comprising an electronic controller connected to said hydraulic power unit to determine which actuator to extend and which actuator to retract; said electronic controller being capable of monitoring said encoder so that it knows precisely the angle of said azimuth platform assembly.

7. A solar collector tracking system comprising:

an elongated vertically oriented tower having a vertically oriented Z-axis, a top end and a bottom end;

a horizontally oriented azimuth platform assembly having a front end and having an open central chamber for housing hydraulic actuators used to rotate said azimuth platform assembly about said vertical Z-axis;

an elongated drive head having a top surface, a bottom surface, an inner end and an outer end; a tubular post is rigidly secured to said bottom surface of said drive head adjacent said inner end; said tubular post being rigidly connected to said top end of said vertically oriented tower; a rigid pivot pin having a vertical X-axis extends upwardly from said top surface of said drive head adjacent said outer end;

a horizontally oriented primary azimuth hydraulic actuator having a front end, a rear end, and a primary piston rod having a front end; a connecting link is rigidly secured to said front end of said primary piston rod and said connecting link is journaled on said pivot pin that is located adjacent said outer end of said drive head; said rear end of said primary azimuth hydraulic actuator being pivotally secured in said open central chamber of said azimuth platform assembly about a vertically oriented S-axis;

a horizontally oriented secondary azimuth hydraulic actuator having a front end, a rear end, and a secondary piston rod having a front end; a coupling is rigidly secured to said front end of said secondary piston rod and said bifurcated coupling is pivotally secured to a vertically oriented pin passing through said connecting link, said pin having a vertical Y-axis that is laterally spaced from said X-axis of said pivotal pin; said rear end of said secondary azimuth hydraulic actuator being pivotally secured in said open central chamber of said azimuth platform assembly about a vertically oriented T-axis;

means journaling said azimuth platform assembly to said top end of said tower;

at least one solar collection device having a front surface and a rear surface;

means pivotally securing said solar collection device to said front end of said azimuth platform assembly so that said solar collection device can be pivoted about a horizontal axis from a vertical operating position to a horizontal storage position; said means comprising a hydraulic activator having a front end, a rear end and a piston rod; the front end of said piston rod is pivotally connected to said rear surface of said solar collection device; said front end of said elevation actuator is pivotally connected to said azimuth platform assembly.

8. A solar collector tracking system as recited in claim 7 further comprising an elongated encoder support arm having a predetermined length, a front end and a rear end; said rear end is rigidly secured to the top end of said pivot pin extending upwardly from said top surface of said drive head; an encoder is connected to said front end of said support arm and it is axially aligned with said Z-axis of said tower.

9. A solar collector tracking system as recited in claim 8 wherein said encoder has a flexible shaft extending downwardly to said front end of said encoder support arm and further comprising said encoder being secured to a top plate of said azimuth platform assembly.

10. A solar collector tracking system as recited in claim 7 further comprising a hydraulic power unit having a supply manifold and means connecting said primary azimuth actuator, said secondary azimuth actuator and said elevation actuator to the supply manifold of said hydraulic power unit.

11. A solar collector tracking system as recited in claim 10 further comprising an accumulator in said hydraulic power unit connected to said supply manifold.

12. A solar collector tracking system as recited in claim 10 further comprising an electronic controller connected to said hydraulic power unit to determine which actuator to extend and which actuator to retract; said electronic controller being capable of monitoring said encoder so that it knows precisely the angle of said azimuth platform assembly.

13. A solar collector tracking system as recited in claim 7 wherein said tubular post and said drive head are formed as an integral member.

* * * * *